United States Patent
Vahala et al.

(10) Patent No.: US 6,580,851 B1
(45) Date of Patent: Jun. 17, 2003

(54) RESONATOR FIBER BIDIRECTIONAL COUPLER

(75) Inventors: Kerry J. Vahala, San Gabriel, CA (US); Ming Cai, Pasadena, CA (US); Guido Hunziker, Neyruz (CH)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 09/440,311

(22) Filed: Nov. 12, 1999

Related U.S. Application Data

(60) Provisional application No. 60/108,358, filed on Nov. 13, 1998.

(51) Int. Cl.[7] .............................. G02B 6/26; G02B 6/293
(52) U.S. Cl. .............................. 385/30; 385/15; 385/24; 385/50; 359/127
(58) Field of Search .............................. 385/11, 15, 24, 385/27, 28, 30, 39, 42, 43, 50; 359/124, 127

(56) References Cited

U.S. PATENT DOCUMENTS

| | | | |
|---|---|---|---|
| 3,589,794 A | 6/1971 | Marcatili | 385/42 |
| 4,720,160 A | 1/1988 | Hicks, Jr. | 385/31 |
| 4,820,008 A | * 4/1989 | Malvern | 385/27 |
| 5,506,712 A | 4/1996 | Sasayama et al. | 359/123 |
| 5,682,401 A | 10/1997 | Joannopoulos et al. | 372/96 |
| 6,009,115 A | 12/1999 | Ho | 372/92 |
| 6,078,605 A | * 6/2000 | Little et al. | 385/15 X |

OTHER PUBLICATIONS

Little, B.E. et al., "Microring Resonator Channel Dropping Filters", Journal of Lightwave Technology, vol. 15, No. 6, Jun. 1997, pp. 998–1005.

* cited by examiner

*Primary Examiner*—John D. Lee
(74) *Attorney, Agent, or Firm*—Fish & Richardson P.C.

(57) ABSTRACT

A resonator, e.g., a silica microsphere or disk, is used between two fiber optic cables to form an add/drop filter. The resonator is resonant with the frequency to be added or dropped. In this way, only that particular channel is added or dropped as needed.

72 Claims, 3 Drawing Sheets

RESONATOR FIBER BIDIRECTIONAL COUPLER

CROSS REFERENCE TO RELATED APPLICATIONS

This claims priority from U.S. Provisional Application, No. 60/108,358, filed Nov. 13, 1998.

BACKGROUND

Modern fiber-optic communications systems use a method called wavelength division multiplexing or WDM to send massive amounts of information at extremely high data rates over a single optical fiber. In these WDM systems there are many optical wavelengths (also called optical channels) that are used to carry the information. The optical power at each of these wavelengths co-propagates with the power at the other wavelengths on a single optical fiber cable. At certain points along the optical fiber, it may be necessary to remove and/or add an optical channel. This can happen, for example, in a long-distance communication system whenever the fiber cable enters a city. It can also happen within a city (or metropolitan area network) when optical channels are routed by using their wavelength. Devices that perform this function are called add/drop filters.

The general principle of these devices is illustrated in FIGS. 1 and 2. FIG. 1 illustrates the properties of the drop function. A wavelength division multiplexed signal 100 is introduced to the #1 port 102 of the add/drop filter 104. A designated wavelength, here $\lambda_3$, is intended to be dropped. The dropped wavelength $\lambda_3$ will be output through port #3 106. The remainder of the spectrum, that is $\lambda_1$, $\lambda_2$, and $\lambda_4$, will be output through the #2 output port 110.

The add function of the add/drop filter is illustrated in FIG. 2. The partial spectrum, $\lambda_1$, $\lambda_2$, $\lambda_4$, is input as input wave 200 (to #1 port). The wavelength to be added, $\lambda_3$, is input through #4 port 202. The complete spectrum with all of $\lambda_1$–$\lambda_4$ is output through #2 output port 210.

Several different kinds of add/drop filter devices have been proposed. Of these approaches one that is most nearly related to this invention is described in "Ultracompact Si—SiO$_2$ Micro-Ring Resonator Optical Channel Dropping Filters", by Little et al (herein "Little"). In that approach, two waveguides are prepared on a wafer using lithography and etching techniques. These waveguides are situated on opposite sides of a disk that has also been defined using lithography and etching. The disk is designed to sustain optical modes, characterized by their resonant wavelength and their quality factors or "Q". The positions of the waveguides permit coupling of optical power between the waveguides and the disk. When the wavelength of this optical power coincides with a resonant wavelength of the disk, optical power can be transferred between the waveguides. This permits realization of the add/drop function.

The Little reference describes a monolithic add-drop device where key components of the device are fabricated onto a single semiconductor chip. Devices like these have several limitations. First, because the Little device is fabricated as waveguides and other parts on a chip, the waveguides and the disk resonator are etched or otherwise defined into the chip. Although fabrication of this kind of monolithic-optical-element lends itself well to mass production, it has drawbacks. There can be a large insertion loss associated with coupling any waveguide created on a wafer to optical fiber. Several undesirable decibels of loss are typical for the fiber-to-chip coupling. Also, the manufacturing process that couples optical fibers to on-chip waveguides is costly. Hence, the cost associated with producing fiber-coupled devices such as in the Little reference can be high. Another disadvantage of the Little device is parasitic optical loss induced during the fabrication process, because of unwanted optical scattering from imperfections at lithographic-defined interfaces. Such loss can adversely affect propagation through the device as well as the quality factor or Q of the resonator.

The optical Q is a figure of merit often cited in optical resonators and provides a reference point as to the quality of a resonator. The optical Q or quality factor of a resonator mode is defined as $Q = \nu/\Delta\nu$ where $\nu$ is the optical frequency of the given mode while $\Delta\nu$ is the modes linewidth. The Q's of the resonators of the present invention can exceed 1 million. High Q is not only important in establishing a basis for comparison of resonator quality, but also affects the way in which the add/drop device functions. In general, higher Q resonators can provide more flexibility in design, and can allow for a wider range of system applications—even beyond the application cited above to add/drop filters.

SUMMARY

The present system teaches a special kind of resonator-based all-fiber optic bi-directional coupler in which optical power is resonantly transferred from a first optical fiber to a second or vice versa by way of coupling to a high-Q optical cavity. One application is to wavelength-division-multiplexed optical communications systems where a version of the device can function as an add/droop filter. Another application would use the ultra-high Q properties of the filter for high-resolution optical spectrum analysis.

This application defines an optical device that has an optical fiber, which has a first thinned portion, formed such that a fraction of the guided optical power propagates outside of the first thinned portion; and a resonator, coupled to said first thinned portion, such that optical power can be transferred to the resonator. The resonator can be spherical, or disk shaped, for example.

A second optical fiber, having a second thinned portion, can be also coupled to said resonator, such that power can be transferred between the first fiber and the second fiber.

BRIEF DESCRIPTION OF THE DRAWINGS

These and other aspects of the invention will now be described with reference to the attached drawings and photographs, in which.

DESCRIPTION OF THE PREFERRED EMBODIMENTS

The inventors recognize that wavelength add and drop filters should have certain desirable characteristics. These desirable characteristics include the following:

The device should have a high drop extinction. This means that the device should produce minimal residual optical power in the place of the now-dropped channel, at the output port. This is important since any such residual information could interfere with new information that would be added in the available wavelength slot.

The device should have very high rejection of non-designated channels. These non-designated channels should not be coupled into the drop port (port No. 3) or to the add port (port no. 4).

There should be low insertion loss of non-designated channels, i.e., there should be minimal attenuation of the wavelengths that are not dropped by the device.

The channels that are to be dropped or added should also be minimally attenuated by the drop and/or add process.

In some applications, the specific channels to be added or dropped should be programmable.

The device should also be easy and inexpensive to couple to an optical fiber. Ideally, the add/drop device could, itself, be composed of optical fiber so that expensive packaging procedures associated with coupling the device to fiber could be avoided.

The optical pass bandwidth of the add/drop device must be greater than or equal to the spectral width of the optical channel. Otherwise information on the channel will be lost, distorted or attenuated.

An embodiment describes a device that can be made from all fiber optic materials and which has substantial advantages.

According to the present system, a resonator, e.g., a microsphere or disk shaped resonator, is coupled to two, single-mode optical fibers which have been prepared with optical tapers. The resonator can be disk shaped, spherical or spheroidal (e.g., a squashed sphere). The tapered fibers can be prepared by heating a portion of the fiber in a flame. Other techniques of forming such tapers are known. The fiber taper is preferably thin enough so that the light wave may be guided in the cladding rather than the core. In addition, the fiber taper is thinned so much that some non-negligible portion of guided optical power is actually outside the glass medium. Diameters of this thinned (i.e., tapered) region can be in the range of 1–10 microns.

A resonator of appropriate type is then placed between parallel, closely-spaced tapered regions of the two optical fibers. Optical power (possibly carrying information) that is propagating in one of the optical fibers couples weakly from the corresponding fiber optic taper to the resonator. However, when the frequency of the optical power is "resonant" with a mode of the optical resonator there will be, in general, a significant increase in the power transferred to the resonator and, in turn, to the second fiber taper.

An embodiment describes an all fiber-optical device with substantial advantages.

Figure 1:
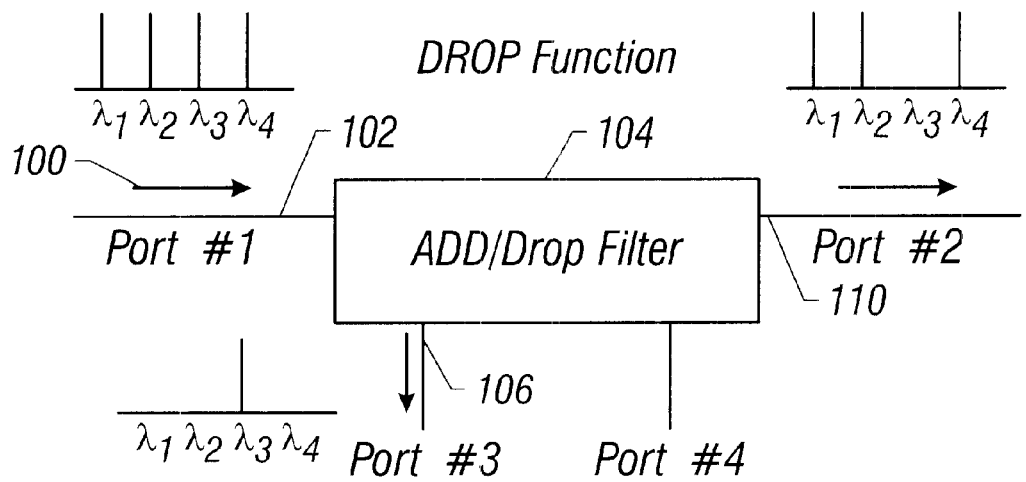
FIGS. 1 & 2 respectively show a standard drop and add filter.
Figure 2:
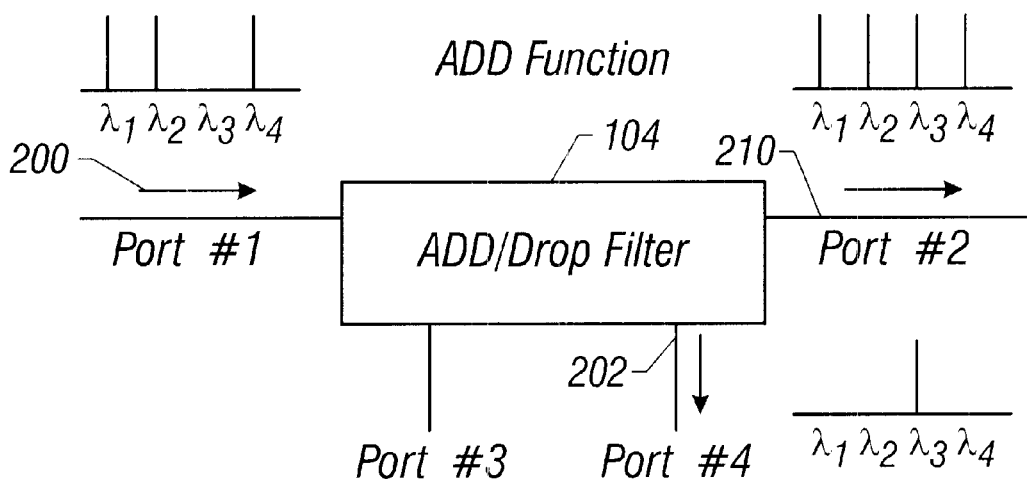
Figure 3:
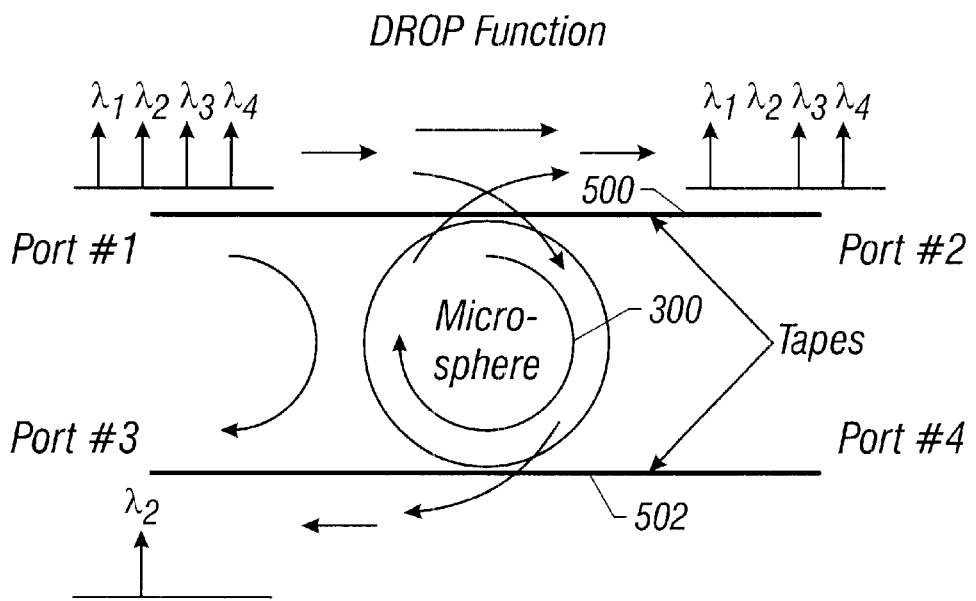
FIGS. 3 & 4 respectively show a drop and add filter function according to an embodiment.
Figure 4:
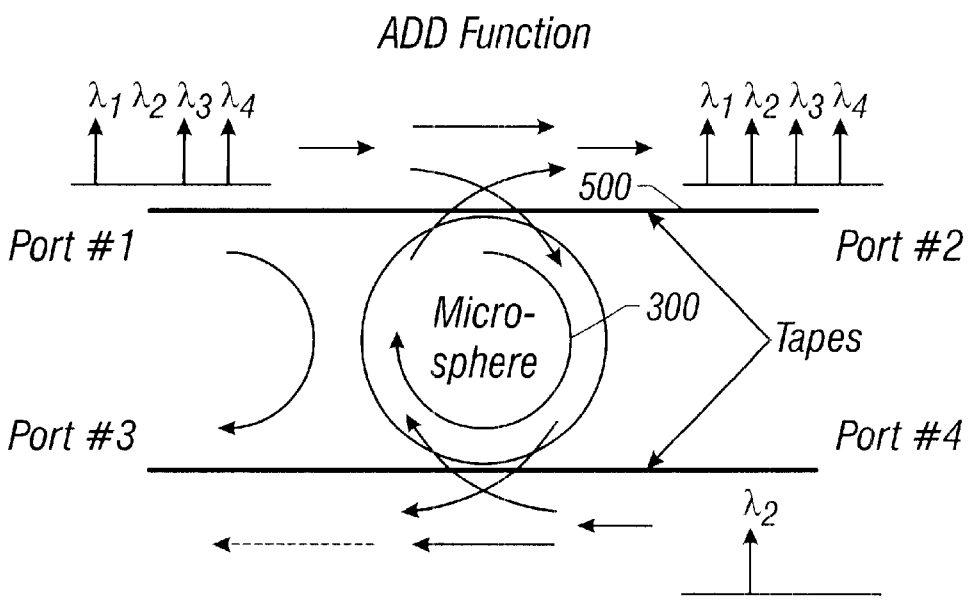

FIG. 3 and FIG. 4 show the system configured to be used as an add/drop filter. The drop function is illustrated in FIG. 3 while the add function is illustrated in FIG. 4). This figure uses the port designations shown in FIGS. 1 and 2. The microsphere resonator 300 is placed between two fibers: a first fiber 500 which carries the original optical channels and the modified channels (ports 1 and 2 respectively), and the second fiber 502 which carries the dropped channel (port 3) or the channel to be added (port 4).

Each of the fibers is tapered at the respective neck locations.

Figure 5:
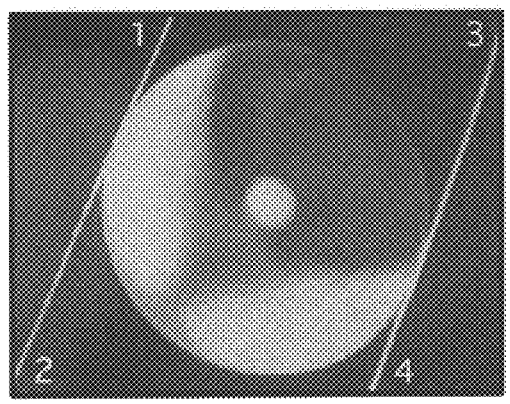
FIG. 5 shows a high magnification photograph of the device.

FIG. 5 shows a high magnification photograph of this embodiment. A 300 micron diameter microsphere resonator 300 is shown between the two fibers 500 and 502. Each of the fibers is 3–5 microns in diameter at the location of the smallest part 501, 503 of the fibers 500, 502. The preferred embodiment in FIG. 3 and FIG. 4 shows the sphere 300 in actual contact with both neck parts of the fibers. However, certain gaps between the fiber and resonator are possible and may even be preferred, since the optical energy can be transferred by evanescent coupling.

Figure 6:
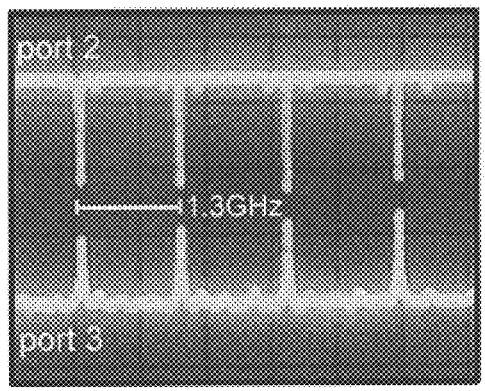
FIG. 6 shows an experimental frequency response of the device in FIG. 5.

FIG. 6 shows the transmission spectra through port #2 and port #3 on the device in FIG. 5. The spectra have been generated by scanning the optical frequency of a light wave which is introduced at port #1. The minima and maxima in the two traces of FIG. 6 correspond to resonances of the spherical resonator appearing in the photo in FIG. 5.

The preferred resonator is a silica microsphere. Other shapes, sizes and materials could be used for the resonator. The spheres can be distorted—for example prolate or oblate. A disk-shaped resonator, for example, could be used. Disk resonators might be simpler in some ways to fabricate and would have a simpler mode spectrum. Disks could also be fabricated using lithographic techniques. Moreover, the sphere or disk could be fabricated using silica or other materials, including, but not limited to, semiconductors or polymer materials.

The transmission line width or bandwidth of these devices using spheres with diameters in the size range of 200–300 microns and tapers with diameters in the range of 3–5 microns is typically between 20 and 100 MHZ. This corresponds to an optical value between 2–10 million. In certain applications, such as in an optical spectrum analyzer, these high Q's and narrow line widths could be very desirable. However, for WDM communications systems in which each optical channel has GigaHertz data rates, it may be desirable to have wider bandwidths and hence lower optical Q's. In addition, the typical mode frequency spacing in the microsphere resonator of the prototype devices may be too narrow for use in the WDM system. For example, in the spectrum of FIG. 6, the mode spacing of 1.3 GigaHertz would be too narrow for high data-bandwidth add/drop applications. Therefore, different features can be modified to increase both the bandwidth associated with the resonant line width as well as the frequency spacing of the resonator modes.

One variation is to intentionally degrade the Q factor of the resonator by reducing its size. Smaller resonators, for example, have lower Q factors and hence wider line widths. Smaller spherical resonators, with diameters in the range of 30–50 microns, for example, have been tested by the co-inventors in a system and can provide sufficient bandwidth to drop an information channel carrying 5 Gigabits/sec of pseudo-random data. The line widths of certain resonator modes in these reduced diameter systems are in the range of 10 GigaHertz with corresponding Q's in the range of 20,000.

As for the mode frequency spacing there are a number of different techniques to increase this number from present values. These include using eccentric spheroidal resonators to increase frequency splitting of resonant modes, or using disk-shaped resonators to eliminate or decrease the azimuthal degrees of freedom of the spherical optical mode.

An important issue in the use of add/drop filters is loss upon coupling to the second taper as well as loss upon transmission past the resonator. In measurements conducted on the prototype devices, the primary contributions to each of these components is from the fiber tapers themselves. The taper to resonator to taper coupling is measured to be extremely efficient, e.g, loss of 99.8% taper-to-resonator-to-taper coupling has been attained. Consistent with this result, very high extinction of the dropped channel has been observed. Extinctions exceeding 27 dB have been observed. This can be attributed to the-high quality of the taper-to-resonator junction (i.e., loss) as well as the nearly identical nature of the two, fiber-taper coupling junctions.

A control mechanism can be used to maintain the wavelength of a particular resonance at or near the wavelength of an optical signal. The feedback control to the sphere could monitor the transmitted power through the possible output ports or even the minute optical power that scatters from the resonator. Feedback could be used to control the optical source emission wavelength or the wavelengths of the resonances of the resonator. Control of wavelength in this process could use temperature or other possibilities described herein.

The system can also be made tunable. One technique tunes by changing the temperature of the resonator or disk by directly heating it using electrical or optical means. In the latter case, a small laser source could be used to heat the resonator.

Another technique uses a coating on the sphere or disk, whose refractive index can be varied by optical or electrical means. For example, some materials are strongly electro-optic so that an applied electric field will induce a change in their refractive index. If the sphere or disk is placed between the plates of a small capacitor, then a voltage applied to the capacitor induces tuning of the sphere resonant frequencies. Possible coatings include but are not limited to selected polymers, liquid crystals, semiconductors, or glasses.

If the resonators are made from a material other than silica, then the material itself could be strongly electro-optic (silica is weakly electro-optic) so that an applied field changes its refractive index and hence tunes the resonant frequencies. Semiconductor spheres or disks exhibit a refractive index that varies with carrier density and hence this could also provide a good tuning mechanism.

Another embodiment would have the system mounted to a substrate to improve its strength and durability. For example, a substrate could be prepared in which alignment grooves, holes etc. are prepared using standard lithographic and etching procedures. Fiber tapers and resonators are then placed into these structures to achieve spatial registration. It can be important for the tapers to be prepared using optical fiber so as to derive the advantages of intrinsic fiber optic compatibility. It could also be possible to prepare the resonator as part of the substrate. For example, a disk resonator similar to that described in the Little reference could be defined in a wafer and fiber tapers then mounted to the wafer by way of registration grooves. Use of a substrate would also make possible the incorporation of electronic control circuits on the same wafer or semiconductor chip.

The preferred embodiment describes fabricating the resonator using silica. However, other materials are possible, including semiconductors and polymer materials.

Figure 7:
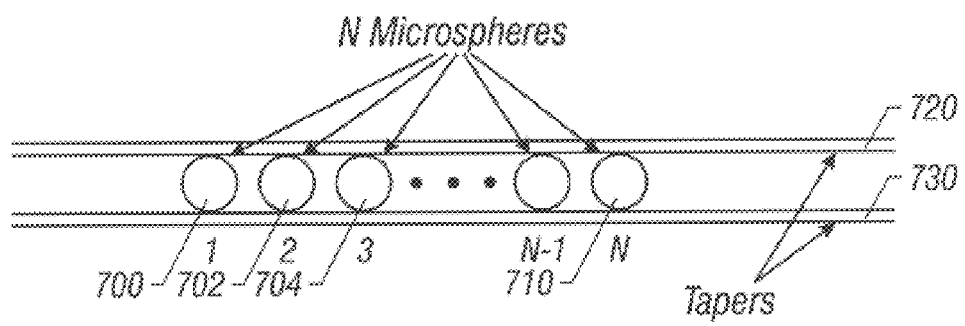
FIG. 7 shows a tunable embodiment using multiple resonators.

Another embodiment shown in FIG. 7 places multiple resonators 700–710 between the two fiber tapers 720, 730. The system of FIG. 7 shows N microsphere resonators 700–710. Each microsphere is close to or touching a respective fiber taper 720, 730. Each resonator can have a different resonant frequency. A more preferred mode is that each of the resonators is tunable independently of the others, using the techniques described above. This embodiment provides a multiple add/drop function in a single device.

The FIG. 7 system could also be formed on a substrate as described above.

The system described above may have transmission characteristics that depend on the optical wave's input polarization. A polarization independent system is possible when two resonators are configured at 90° relative to one another to independently couple orthogonal polarization states of a particular optical channel. Provided the coupling characteristics of the resonators are nearly the same, the result will be nearly polarization independent. In addition, the spacing between the two 90° oriented resonators should be as close as possible to minimize path-length difference of the two coupled orthogonal states of polarization.

In particular, it is important to note that the channel add/drop function is not the only possible application of this invention. Its ultra-high Q properties give it unique attributes in many fiber-based applications requiring ultra-narrow-band optical filters. This could include, for example, but is not limited to optical spectrum analyzers or narrow-band spectral sampling devices.

Although only a few embodiments have been described in detail above, those having ordinary skill in the art certainly understand that modifications are possible.

What is claimed is:

1. An optical device, comprising:
   an optical fiber, which has a first thinned portion, formed such that a fraction of the guided optical power propagates in what was previously the cladding of said optical fiber; and
   a spheroid shaped resonator, coupled to said first thinned portion, such that optical power can be transferred to the resonator.

2. A device as in claim 1 further comprising a second optical fiber, having a second thinned portion, and also coupled to said resonator, such that power can be transferred between the first fiber and the second fiber.

3. A device as in claim 2 further comprising a substrate, having a first area for holding said first thinned portion of said first optical fiber, a second area for holding said second thinned portion of said second optical fiber and a third indented portion for holding said resonator.

4. A device as in claim 3 further comprising an electronic tuning element, formed on said substrate in a proximity of said resonator and energizable to tune a resonant mode of said resonator.

5. A device as in claim 4 further comprising a control circuit for said electrooptic tuning element, formed in said substrate.

6. A device as in claim 5 wherein said tuning element is a resistive heater.

7. A device as in claim 4 wherein said tuning element includes a laser which heats said resonator.

8. A device as in claim 3 further comprising a plurality of resonators coupled to the said first and second fibers.

9. A device as in claim 2 further comprising means for reducing a polarization dependence of the system.

10. A device as in claim 2 wherein said resonator is mounted to couple to a first polarization state, and further comprising a second resonator which is mounted to couple to a second polarization state different than said first polarization state.

11. A device as in claim 10 wherein said second polarization state is orthogonal to said first polarization state.

12. A device as in claim 10 further comprising a tuning element, enabling a resonant mode of said resonator to be tuned.

13. A device as in claim 2 further comprising at least one additional resonator, also coupled optically to the thinned portion, said at least one additional resonator having at least one optical characteristic that is different than said resonator.

14. A device as in claim 13 wherein said optical characteristic is a resonant mode frequency.

15. A device as in claim 13 wherein said optical characteristic is a polarization state.

16. A device as in claim 2 further comprising a plurality of resonators coupled to the said first and second fibers.

17. A device as in claim 16 further comprising tuning mechanisms, which tune the frequencies of the resonator modes in each resonator making up said plurality.

18. A device as in claim 2 further comprising a tuning mechanism, which tunes the frequencies of the resonator modes.

19. A device as in claim 2 wherein said power that is detected is transmitted power coupled to the second fiber through the resonator from the first fiber and said transmitted power is maximized.

20. A device as in claim 1 further comprising a tuning mechanism, which tunes the frequencies of the resonator modes one of continuously in a repetitive scanning mode, or in discrete jumps.

21. A device as in claim 20 wherein said resonator is tuned by changing the temperature of the resonator.

22. A device as in claim 21 further comprising a resistive heating element, selectively energizable to increase a temperature of said resonator to thereby change a resonant frequency thereof.

23. A device as in claim 21 wherein said tuner comprises a laser for heating said resonator.

24. A device as in claim 20 wherein said tuning is carried out by providing a plurality of additional resonators, each resonator having a different resonant mode.

25. A device as in claim 20 wherein said resonator is disk-shaped.

26. A fiber optic channel modifying device, comprising:
   a first optical fiber, carrying a plurality of optical channels;
   said first optical fiber having a first thinned portion thinned by an amount that allows optical energy to pass through a cladding;
   a second optical fiber, also having a second thinned portion;
   a resonator, coupled optically to said first and second thinned portions;
   a silicon substrate, having first and second fiber holding surfaces for respectively receiving said first and second optical fibers, and having a resonator holding surface for receiving said resonator;
   a temperature controlling mechanism located in the vicinity of said resonator; and
   a feedback mechanism, monitoring some parameter indicative of proper resonance, said feedback mechanism integrated into said silicon substrate.

27. A device as in claim 26 wherein said device is used as a channel dropping device, and said resonator is resonant with a frequency of a channel to be dropped.

28. A device as in claim 26 wherein said device is to be used as a channel adding device, and said resonator is resonant with a channel to be added.

29. A device as in claim 26 further comprising a plurality of additional resonator devices, each said resonator device having a different optical characteristic.

30. A device as in claim 29 wherein said optical characteristic is the resonant mode frequency.

31. A device as in claim 29 wherein said optical characteristic is a polarization state.

32. A device as in claim 26 further comprising at least one additional resonator.

33. A device as in claim 32 wherein said additional resonator has a different resonant frequency than said resonator.

34. A device as in claim 32 further comprising a control circuit for the temperature controlling mechanism, said control circuit integrated in said silicon substrate.

35. A device as in claim 26 wherein said resonator is disk shaped.

36. A device as in claim 26 wherein said resonator is made of silica glass.

37. An optical device, comprising:
   an optical fiber, which has a first thinned portion, formed such that a fraction of the guided optical power propagates in what was previously the cladding of said optical fiber;
   a spheroid shaped resonator, coupled to said first thinned portion, such that optical power can be transferred to the resonator;
   a second optical fiber, having a second thinned portion, and also coupled to said resonator, such that power can be transferred between the first fiber and the second fiber; and
   a substrate, having a first area for holding said first thinned portion of said first optical fiber, a second area for holding said second thinned portion of said second optical fiber and a third indented portion for holding said resonator.

38. An optical device, comprising:
   an optical fiber, which has a first thinned portion, formed such that a fraction of the guided optical power propagates in what was previously the cladding of said optical fiber;
   an electronic tuning element formed on a substrate in a proximity of a resonator;
   a control circuit for said electrooptic tuning element, formed in said substrate; and
   a resonator, coupled to said first thinned portion, such that optical power can be transferred to the resonator wherein said tuning element is an electronic tuning element, including a laser which heats said resonator.

39. A fiber optic channel modifying device, comprising:
   a first optical fiber, carrying a plurality of optical channels;
   said first optical fiber having a first thinned portion;
   a second optical fiber, also having a second thinned portion; and
   a resonator, coupled optically to said first and second thinned portions wherein said resonator is a spherically shaped piece of silica glass.

40. A device as in claim 39 further comprising a tuning element which tunes to maximize the scattered power.

41. A device as in claim 40 wherein said tuning element includes a device which modifies the temperature of the resonator to vary its resonant frequencies.

42. A device as in claim 40 wherein said tuning element includes an electrooptic device.

43. An optical add/drop filter, comprising:
   a resonator, having a resonant mode of operation;
   a first optical fiber, in which signals pass from a first end to a second end, the first end including an input signal or signals, and the second end including a first output signal or signals, and a first thinned portion passing adjacent said resonator; and
   a second optical fiber, having a second thinned portion passing adjacent said resonator, and in which signals pass from a first end to a second end, the first end defining an input port for an add function and the second end defining an output port for a drop function wherein said resonator is a silica microsphere.

44. A fiber coupling device comprising:
a first optical fiber, having a thinned portion thinned by an amount that is effective to guide optical energy through a cladding of said optical fiber;
a spheroid shaped optical resonator;
a substrate, said substrate having a surface with a first notch formed therein adapted to physically contain said thinned portion of said fiber; and first optical resonator holding portion, located on said surface of said substrate, and positioning said resonator adjacent to said thinned portion of said fiber, such that optical energy is coupled between said resonator and said fiber.

45. A device as in claim 44 further comprising a second optical fiber with a second thinned portion, and a second notch formed in the surface of said substrate, holding said second thinned portion, thereby forming an add/drop filter which enables adding a channel from said second fiber or dropping a channel to said second fiber.

46. A device as in claim 44 further comprising a control circuit integrated into or onto the substrate, and coupled to its said resonator.

47. A device as in claim 46 wherein said control circuit is a tuning circuit for said resonator.

48. A device as in claim 47 wherein said tuning circuit comprises a selective heating element, located in a vicinity of said resonator to selectively heat said resonator and thereby change the resonant frequency thereof.

49. A device as in claim 46 wherein said control circuit is an element which controls some aspect of operation of said resonator.

50. A device as in claim 46 wherein such control circuit is a feedback controlling device and further comprising a parameter monitor which monitors the parameter indicative of desired condition, said feedback controlling device controlling a tuning of said resonator to maintain said desired condition.

51. An optical device, comprising:
an optical fiber, which has a first thinned portion, formed such that a fraction of the guided optical power propagates outside of the first thinned portion; and
a resonator, coupled to said first thinned portion, such that optical power can be transferred to the resonator further comprising a second optical fiber, having a second thinned portion, and also coupled to said resonator, such that power can be transferred between the first fiber and the second fiber wherein said resonator is spherical in shape.

52. An optical device, comprising:
an optical fiber, which has a first thinned portion, formed such that a fraction of the guided optical power propagates outside of the first thinned portion; and
a resonator, coupled to said first thinned portion, such that optical power can be transferred to the resonator further comprising a second optical fiber, having a second thinned portion, and also coupled to said resonator, such that power can be transferred between the first fiber and the second fiber wherein said resonator is spheroid-shaped.

53. An optical device, comprising:
an optical fiber, which has a first thinned portion, formed such that a fraction of the guided optical power propagates in what was previously the cladding of said optical fiber; and
a spheroid shaped resonator, coupled to said first thinned portion, such that optical power can be transferred to the resonator further comprising a tuning mechanism, which tunes the frequencies of the resonator modes one of continuously in a repetitive scanning mode, or in discrete jumps.

54. A fiber optic channel modifying device, comprising:
a first optical fiber, carrying a plurality of optical channels;
said first optical fiber having a first thinned portion thinned by an amount that allows optical energy to pass through a cladding;
a second optical fiber, also having a second thinned portion; and
a resonator, coupled optically to said first and second thinned portions wherein said resonator is spheroid shaped.

55. An optical add/drop filter, comprising:
a resonator, having a resonant mode of operation;
a first optical fiber, in which signals pass from a first end to a second end, the first end including an input signal or signals, and the second end including a first output signal or signals, and a first thinned portion passing adjacent said resonator thinned by an amount that is effective to allow an optical signal to pass through a part of said fiber that was previously the cladding; and
a second optical fiber, having a second thinned portion passing adjacent said resonator, and in which signals pass from a first end to a second end, the first end defining an input port for an add function and the second end defining an output port for a drop function wherein said resonator is a spheroid-shaped element.

56. A filter as in claim 55 wherein said resonator is made of silica.

57. A method of transferring optical signals between optical fibers, comprising:
obtaining a portion of each of first and second optical fibers which have a narrowed portion and a non-narrowed portion;
coupling waves through said narrowed portions, to pass through a cladding of said optical fibers; and
placing a spheroid shaped resonator near said narrowed portions, sufficiently close that optical coupling of waves can occur between said narrowed portion and said resonator.

58. A method as in claim 57 further comprising adding a channel by supplying an optical wavelength which is resonant with said resonator into said second fiber to thereby add said optical channel.

59. A method as in claim 58 further comprising dropping an optical channel.

60. A method as in claim 57 further comprising tuning the resonator.

61. A method as in claim 60 wherein said tuning comprises controlling a temperature of the resonator.

62. A method as in claim 61 wherein at least one of said additional resonators has a different polarization than said resonator.

63. A method as in claim 61 wherein at least one of said additional resonators has a different optical mode frequency than said resonator.

64. A method as in claim 60 wherein said tuning uses an electro-optic element.

65. A method as in claim 60 further comprising monitoring a parameter indicative of a desired condition of a system, and using said parameter as feedback to determine an amount of tuning.

66. A method as in claim 65 wherein said parameter is power.

67. A method as in claim 66 wherein said power is a transmitted power, and said tuning is modified to minimize the transmitted power.

68. A method as in claim 66 wherein said power is scattered circulating resonator power, and wherein said tuning comprises tuning the resonator to maximize the scattered power.

69. A method as in claim 57 wherein said optical coupling is evanescent coupling.

70. A method as in claim 57 further comprising placing additional resonators having different optical characteristics than said resonator, into optical contact with said thinned portion.

71. A method of adding or dropping a channel on an optical fiber comprising:
    providing a thinned portion in the optical fiber in which the channel is to be added or dropped;
    bringing the thinned portion into an optical coupling with a spheroid shaped optical resonator; and
    tuning the resonator to a desired frequency for adding or dropping the channel to thereby add or drop the channel at the desired tuned frequency.

72. A method as in claim 71 wherein said resonator is one which supports whispering gallery modes.

* * * * *